United States Patent
Ashibe et al.

(10) Patent No.: US 7,030,314 B2
(45) Date of Patent: Apr. 18, 2006

(54) TERMINATION STRUCTURE OF CRYOGENIC CABLE

(75) Inventors: Yuuichi Ashibe, Osaka (JP); Yoshihisa Takahashi, Tokyo (JP); Kimiyoshi Matsuo, Tokyo (JP); Shoichi Honjo, Tokyo (JP); Tomoo Mimura, Tokyo (JP)

(73) Assignees: Sumitomo Electric Industries, Ltd., Osaka (JP); The Tokyo Electric Power Company, Incorporated, Tokyo (JP)

( * ) Notice: Subject to any disclaimer, the term of this patent is extended or adjusted under 35 U.S.C. 154(b) by 0 days.

(21) Appl. No.: 10/840,361

(22) Filed: May 7, 2004

(65) Prior Publication Data
US 2004/0256143 A1    Dec. 23, 2004

(30) Foreign Application Priority Data
Jun. 19, 2003    (JP)    ............................... 2003-174183

(51) Int. Cl.
*H01B 9/06*    (2006.01)
*H01B 12/00*    (2006.01)

(52) U.S. Cl. ..................................... 174/15.1; 174/15.4
(58) Field of Classification Search ............... 174/15.1, 174/15.2, 15.4, 15.5, 21 R, 21 JS, 74 R, 174/78, 84 R, 88 C
See application file for complete search history.

(56) References Cited

U.S. PATENT DOCUMENTS

| | | | | |
|---|---|---|---|---|
| 3,902,000 A | * | 8/1975 | Forsyth et al. | ............. 174/15.3 |
| 4,485,266 A | * | 11/1984 | Minati et al. | ............. 174/15.4 |
| 6,112,531 A | * | 9/2000 | Yamaguchi | ................. 62/51.1 |
| 2004/0211586 A1 | * | 10/2004 | Sinha et al. | ............. 174/125.1 |

FOREIGN PATENT DOCUMENTS

| | | |
|---|---|---|
| DE | 42 08 378 A1 | 9/1993 |
| FR | 1 541 809 A | 10/1968 |
| JP | 59132179 | 7/1984 |
| JP | 08 196029 A | 7/1996 |
| JP | 8-265956 | 10/1996 |
| WO | WO 02/29930 A2 | 4/2002 |

* cited by examiner

*Primary Examiner*—William H. Mayo, III
(74) *Attorney, Agent, or Firm*—Foley & Lardner LLP

(57) ABSTRACT

A termination structure of a cryogenic cable has a cryogenic-cable end portion and a current-lead end portion that are coupled to each other with a flexible conductor. Accordingly, any displacement in three-dimensional directions of the end portions that could occur due to thermal expansion and thermal contraction of the cryogenic cable and the current lead can be absorbed, and a sufficient current capacity can be ensured.

15 Claims, 1 Drawing Sheet

TERMINATION STRUCTURE OF CRYOGENIC CABLE

BACKGROUND OF THE INVENTION

1. Field of the Invention

The present invention relates to a termination structure of such a cryogenic cable as a superconducting cable, and particularly to a structure for coupling an end portion of the cryogenic cable to an end portion of a current lead connected to an external electric-current system which is at a room temperature.

2. Description of the Background Art

A normal-conducting cable has its end portion where the normal-conducting cable is raised perpendicularly to the longitudinal direction of the normal-conducting cable to be linearly connected to an end portion of a current lead extending to an external electric-current system.

As for a cryogenic cable, the cryogenic cable thermally contracts when cooled with liquid nitrogen for example while it thermally expands in a case where the cable has to be increased in temperature due to some accident for example. Under these situations, the end portion of the cryogenic cable is displaced in the longitudinal direction of the cable. The end portion is thus provided with a blocking part that blocks the movement of the cable in the longitudinal direction. Accordingly, the end portion of the cryogenic cable is linearly connected to a normal conductor and then to an end portion of a current lead provided perpendicularly thereto so as to form an L-shaped joint.

The end portion of the current lead is also displaced in the longitudinal direction of the current lead due to thermal contraction when cooled with liquid nitrogen for example, thermal expansion when heat is generated due to electric current flowing therethrough, or the like. In such a case, the joint portion could be broken, leading to impairment of the reliability of the whole system.

Japanese Patent Laying-Open No. 8-265956 for example discloses a method of absorbing thermal contraction and thermal expansion of a cryogenic cable. According to this method, the end portion of the cryogenic cable is made movable and the end portion is slid in accordance with an amount of thermal contraction or an amount of thermal expansion of the cryogenic cable so as to absorb the amount of thermal contraction or expansion.

Specifically, the end portion of this cryogenic cable includes a mechanism for sliding the end portion in the longitudinal direction of the cryogenic cable and means for measuring any change of the cryogenic cable that occurs due to thermal contraction thereof for example, and the end portion is slid according to the measurement. More specifically, the sliding mechanism for sliding the end portion in the longitudinal direction of the cryogenic cable has wheels on a joint portion between the cryogenic cable and a current lead and this joint portion on the wheels accordingly moves on rails.

The above-described method, however, requires the mechanism for sliding the end portion of the cryogenic cable in the longitudinal direction of the cable, i.e., wheels and rails for example, as well as the means for measuring a change of the cable caused by thermal contraction for example of the cable. Therefore, the structure is complex and an additional operation is necessary for sliding the end portion in the longitudinal direction of the cable according to a measurement, resulting in such problems as deterioration in reliability and increase in cost for manufacture and maintenance. There arises a further problem that, since the current lead is also slid in the longitudinal direction of the cable, a connector portion between the current lead and an external electric-current system encounters a compression force for example due to the sliding in the longitudinal direction of the cable.

In addition, the above-described method aims to absorb thermal contraction and thermal expansion in the longitudinal direction of the cryogenic cable, and does not aim to absorb any displacement in the longitudinal direction of the current lead. Thus, this method does not solve the problem of the breakage of the joint or connector portion due to any displacement in the longitudinal direction of the current lead and the resultant impairment of the reliability of the whole system.

SUMMARY OF THE INVENTION

An object of the present invention is to provide a termination structure of a cryogenic cable that can absorb displacements in three-dimensional directions caused by thermal contraction and thermal expansion of the cryogenic cable and the current lead and ensure a sufficient electric-current capacity, without the above-described complex structure and special operations.

According to a first aspect of the present invention, in order to achieve the above-described object, a cryogenic cable and a current lead are coupled to each other with a flexible conductor.

Specifically, according to the first aspect of the invention, a termination structure of a cryogenic cable is provided having an end portion of the cryogenic cable and an end portion of a current lead that are coupled to each other with a flexible conductor. The flexible conductor can thus be used to absorb any displacement of the end portion of the cryogenic cable in the longitudinal direction thereof and accommodate any tolerance in three-dimensional directions.

According to a second aspect of the present invention, connection is effected with a multi-contact in order to more effectively absorb any displacement of the end portion of the current lead in the longitudinal direction thereof.

Specifically, according to the second aspect of the invention, the termination structure of a cryogenic cable of the first aspect is provided to have a conductive terminal on the end portion of the current lead and the end portion of the current lead and the conductive terminal are connected to each other with the multi-contact.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
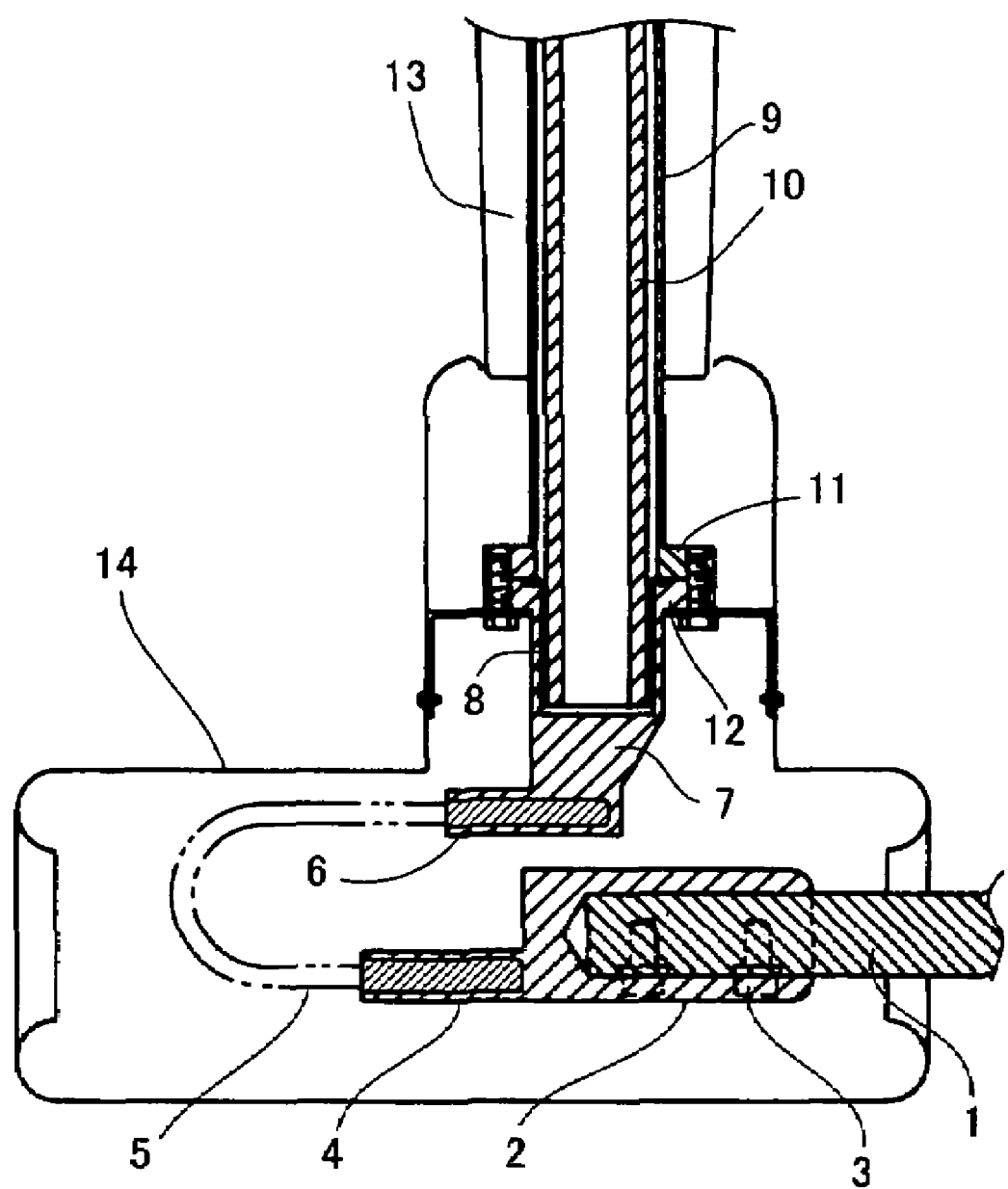
FIG. 1 is a cross-sectional view exemplarily showing a termination structure of a cryogenic cable according to the present invention.

To an end portion of a cryogenic cable, usually a normal conductor is linearly connected and an electrically-conductive terminal (hereinafter conductive terminal) formed of a normal conducting material is further provided on the leading end of the normal conductor for facilitating coupling to an end portion of an electric-current lead. A conductive terminal is also provided on the end portion of the current lead for facilitating coupling. Here, if the end portion of the cryogenic cable or current lead has the normal conductor and the conductive terminal, the term "end portion" refers to the one including these normal conductor and conductive terminal.

A flexible conductor couples respective end portions of the cryogenic cable and the current lead to each other and the flexible conductor is required to have sufficient current-capacity characteristics in addition to the flexibility. A preferable example of the conductor satisfying these requirements is a braided wire. The braided wire is an assembly of many thin metal wires in parallel with each other. Metal wires of copper or aluminum for example are used.

Respective ends of the braided wire are connected respectively to the end portion of the cryogenic cable and the end portion of the current lead. The end portion of the cryogenic cable and/or the end portion of the current lead are/is provided with (respective) conductive terminal(s) and preferably the conductive terminal(s) and the braided wire are connected to each other by brazing (silver brazing for example), soldering or crimping of the conductive terminal(s) for ensuring the connection and a large current capacity. The conductive terminal should be of a shape and a size appropriate for ensuring a sufficient current capacity, and the conductive terminal is preferably made of copper or aluminum for example.

If the termination structure of the cryogenic cable of the present invention is used for transmitting electric power, a large voltage is applied to the termination structure of the cryogenic cable. Then, if the coupling section between respective end portions of the cryogenic cable and the current lead or a lower part of the current lead has any protruded portion, an electric-field concentration occurs on the protruded portion and consequently an allowable stress could be exceeded. For this reason, the coupling section between the end portion of the cryogenic cable and the end portion of the current lead is preferably covered with an electric-field relaxation shield with which the electric field can be controlled.

The current lead is a conductor for connection to an external electric-current system for example and is made of copper for example. The current lead is usually pipe-shaped and nitrogen for example may be flown through the pipe for cooling. Moreover, a cable may be provided through the pipe for a sensor measuring the temperature for example of the lower part of the current lead. It is noted that, because of the skin effect of the current, the pipe-shaped conductor is not significantly disadvantageous in terms of current conduction as compared with a solid conductor.

A large voltage is applied to the current lead. Therefore, in order to keep electrical insulation from a grounded portion, the current lead is usually covered with a bushing made of an insulation material, and the bushing is covered with a pipe insulator. In most cases, however, the lower part of the current lead is not covered with the insulation material in order to connect to the conductive terminal for example. In this case, for example, preferably the exposed lower part of the current lead is covered with an electric-field relaxation shield and the space formed between the lower part of the lead and such a grounded portion as container or sidewall is filled with an electric insulation refrigerant, for example, liquid nitrogen. Preferably, the bushing is made of FRP (Fiber Reinforced Plastics), and more preferably of GFRP (Glass Fiber Reinforced Plastics).

As described above, the end portion of the current lead preferably has the conductive terminal. Further, the end portion of the current lead is displaced in the longitudinal direction of the current lead due to thermal contraction for example of the current lead. In order to absorb this displacement, preferably the current lead and the conductive terminal are connected to each other with a multi-contact.

Specifically, the conductive terminal has a hollowed part having a diameter slightly greater than the outer diameter of the current lead, and a predetermined number of grooves are made in the hollowed part or a predetermined number of grooves are made on the outer periphery of the lower part of the current lead. Into these grooves, one or a plurality of electrically-conductive elastic bodies (usually referred to as multi-band) are inserted and thereafter the end portion of the current lead is inserted into the hollowed part of the conductive terminal to connect them to each other.

With the above-described multi-contact connection, a large current can be carried and the end portion of the current lead slides in the hollowed part, which is preferable in that any displacement of the end portion of the current lead in the longitudinal direction of the current lead can be absorbed.

A description is now given of a specific example of preferred embodiments of the present invention. FIG. 1 shows a normal conductor 1 connected linearly to an end portion of a cryogenic cable, and a conductive terminal 2 fixed to an end of normal conductor 1. In this embodiment, normal conductor 1 is inserted into a hollowed part of conductive terminal 2 and fixed thereto with screws 3. A terminal end 4 of conductive terminal 2 is joined to a braided wire 5 by soldering or brazing.

The way to connect braided wire 5, conductive terminal 2 and normal conductor 1 is not limited to the above-described ones. For example, conductive terminal 2 and normal conductor 1 may be connected to each other with the multi-contact. Braided wire 5 and conductive terminal 2 may be connected to each other with a rectangular-racket-shaped conductive terminal on which the end of braided wire 5 is fixed with screws for example. Further, as described above, instead of soldering and brazing, crimping may appropriately be used. Crimping of the conductive terminal is advantageous in that no soldering or brazing material is necessary.

The other end of braided wire 5 is joined to a terminal end 6 of a conductive terminal 7 provided on the end portion of a current lead 10 by soldering or brazing. In a hollowed part provided in an upper part of conductive terminal 7, a lower part of the end portion of current lead 10 is inserted and they are connected to each other with a multi-contact 8.

Pipe-shaped current lead 10 is covered with a stainless or aluminum pipe 9. A lower part of pipe 9 forms a flange 11 and this flange 111 is fixed to a flange 12 formed on an upper part of conductive terminal 7 with bolts. Conductive terminal 2 and normal conductor 1 are immersed in liquid nitrogen, and this flange structure is employed for preventing the liquid nitrogen from escaping to the outside.

Pipe 9 is covered with a bushing 13 which is further covered with a pipe insulator (not shown). It is noted that the lower part of current lead 10 is not covered with bushing 13 and the portion extending downwardly from this part is covered with an electric-field relaxation shield 14. Electric-field relaxation shield 14 is rounded in shape without protruded portion for the purpose of alleviating stress.

With the termination structure of a cryogenic cable of the present invention, thermal contraction of the cable that occurs when the cable is cooled and thermal expansion of the cable that occurs in a case where the cable has to be increased in temperature due to some accident can be absorbed by deformation of the flexible conductor. Therefore, even if the cable thermally contracts or expands, no compression force for example is generated to the end portion of the cable. In this way, breakage of the termination structure that could occur due to the compression force for example can be prevented and thereby the reliability of the system can be improved. This effect is enhanced particularly when the flexible conductor is a braided wire.

Further, with the termination structure of the present invention, any tolerance in the longitudinal direction and the direction perpendicular thereto of the cryogenic cable in assembling the termination structure can be absorbed by deformation of the flexible conductor. A further effect can thus be achieved that the assembly of the termination structure is facilitated.

Moreover, as the conductive terminal is provided on the end portion of the current lead and the end portion of the current lead and the conductive terminal are connected to each other with the multi-contact, any displacement in the longitudinal direction of the current lead that could occur due to thermal contraction or expansion of the current lead can be absorbed.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A termination structure of a cryogenic cable comprising:
   a cryogenic-cable end portion;
   a current-lead end portion; and
   a flexible conductor having a first end connected to said cryogenic-cable end portion and a second end connected to said current-lead end portion, said flexible conductor bent in a "U"-shape such that the first and second ends of the flexible conductor are oriented in the same direction as a longitudinal direction of said cryogenic-cable end portion.

2. The termination structure of the cryogenic cable according to claim 1, wherein said flexible conductor consists essentially of one of copper or aluminum.

3. The termination structure of the cryogenic cable according to claim 1, wherein said flexible conductor comprises a braided wire.

4. The termination structure of the cryogenic cable according to claim 3, wherein said braided wire consists essentially of copper or aluminum.

5. The termination structure of the cryogenic cable according to claim 4, wherein a conductive terminal is provided to at least one of (1) said cryogenic-cable end portion and (2) said current-lead end portion, and said conductive terminal and said braided wire are connected to each other by one of brazing, soldering or crimping of said conductive terminal.

6. The termination structure of the cryogenic cable according to claim 1, wherein a coupling portion between said cryogenic-cable end portion and said current-lead end portion is covered with an electric-field relaxation shield capable of controlling an electric field.

7. The termination structure of the cryogenic cable according to claim 1, wherein a coupling portion between said cryogenic-cable end portion and said current-lead end portion is entirely covered with an electric-field relaxation shield capable of controlling an electric field.

8. The termination structure of the cryogenic cable according to claim 1, wherein a first conductive terminal is provided to said current-lead end portion and a second conductive terminal is provided to said current-lead end portion and said first and second conductive terminals are connected to each other with a multi-contact.

9. A termination structure of a cryogenic cable comprising:
   a cryogenic-cable end portion;
   a current-lead end portion; and
   a flexible conductor connecting said cryogenic-cable end portion and said current-lead end portion to each other, wherein
   said current-lead end portion has a conductive terminal, said conductive terminal has a hollowed part, said hollowed part or an outer periphery of a lower part of said current-lead end portion have a predetermined number of grooves, and, with an electrically-conductive elastic body inserted into said grooves, said current-lead end portion is inserted into said hollowed part.

10. The termination structure of the cryogenic cable according to claim 9, wherein said flexible conductor comprises a braided wire.

11. The termination structure of the cryogenic cable according to claim 10, wherein said braided wire consists essentially of one of copper and aluminum.

12. The termination structure of the cryogenic cable according to claim 11, wherein a conductive terminal is provided to at least one of (1) said cryogenic-cable end portion and (2) said current-lead end portion, and said conductive terminal and said braided wire are connected to each other by one of brazing, soldering or crimping of said conductive terminal.

13. The termination structure of the cryogenic cable according to claim 9, wherein a coupling portion between said cryogenic-cable end portion and said current-lead end portion is entirely covered with an electric-field relaxation shield capable of controlling an electric field.

14. The termination structure of the cryogenic cable according to claim 9, wherein a first conductive terminal is provided to said current-lead end portion and a second conductive terminal is provided to said current-lead end portion and said first and second conductive terminals are connected to each other with a multi-contact.

15. The termination structure of the cryogenic cable according to claim 9, wherein said termination structure is used for transmitting electric power.

* * * * *